US007020599B1

(12) United States Patent
Cao et al.

(10) Patent No.: US 7,020,599 B1
(45) Date of Patent: Mar. 28, 2006

(54) MEAN TIME TO RECOVER (MTTR) ADVISORY

(75) Inventors: Qiang Cao, Burlingame, CA (US); Sushil Kumar, Mountain View, CA (US); Tirthankar Lahiri, Santa Clara, CA (US); Yunrui Li, Fremont, CA (US); Gianfranco Putzolu, San Francisco, CA (US)

(73) Assignee: Oracle International Corporation (OIC), Redwood Shores, CA (US)

( * ) Notice: Subject to any disclaimer, the term of this patent is extended or adjusted under 35 U.S.C. 154(b) by 771 days.

(21) Appl. No.: 10/017,337

(22) Filed: Dec. 13, 2001

(51) Int. Cl.
*G06F 9/45* (2006.01)

(52) U.S. Cl. ............................. 703/22; 714/6; 714/15; 713/200; 707/202; 707/206; 707/102

(58) Field of Classification Search .................. 703/22; 707/202, 206, 102, 203, 8, 1; 714/6, 15; 713/200; 717/130
See application file for complete search history.

(56) References Cited

U.S. PATENT DOCUMENTS

| 5,996,088 | A | * | 11/1999 | Frank et al. ..................... 714/6 |
| 6,253,212 | B1 | | 6/2001 | Loaiza et al. ................ 707/202 |
| 6,351,754 | B1 | | 2/2002 | Bridge, Jr. et al. ......... 707/207 |
| 6,493,826 | B1 | * | 12/2002 | Schofield et al. ........... 713/200 |
| 6,631,478 | B1 | * | 10/2003 | Wang et al. .................... 714/15 |
| 6,678,704 | B1 | | 1/2004 | Bridge, Jr. et al. ......... 707/202 |
| 6,735,593 | B1 | * | 5/2004 | Williams ..................... 707/102 |
| 6,826,748 | B1 | * | 11/2004 | Hohensee et al. ........... 717/130 |
| 2002/0091718 | A1 | * | 7/2002 | Bohannon et al. .......... 707/202 |
| 2002/0099729 | A1 | * | 7/2002 | Chandrasekaran et al. .. 707/203 |

(Continued)

OTHER PUBLICATIONS

Lee et al., "Checkpointing schemes for fast restart in main memory database systems", IEEE, 1997.*

(Continued)

*Primary Examiner*—Paul L. Rodriguez
*Assistant Examiner*—Kandasamy Thangavelu
(74) *Attorney, Agent, or Firm*—Silicon Valley Patent Group LLP (57) ABSTRACT

A method for simulating different MTTR settings includes determining a simulated MTTR setting and providing a simulated checkpoint queue. The simulated checkpoint queue is associated with the simulated MTTR setting and is an ordered list of one or more elements. Each element represents a buffer, and the ordered list has a head and a tail. The method also includes providing a simulated write counter associated with the simulated MTTR setting. The method further includes, in response to detecting a change to a first buffer, checking if the first buffer is represented in the simulated checkpoint queue. If the first buffer is not represented in the simulated checkpoint queue, an element that represents the first buffer is linked to the tail of the simulated checkpoint queue. An MTTR advisory system includes a memory, one or more processors coupled to the memory, a simulated MTTR setting, a simulated checkpoint queue, and a simulated write counter. The simulated MTTR setting is maintained in the memory. The simulated checkpoint queue is maintained in the memory and associated with the simulated MTTR setting. The simulated write counter is also maintained in the memory, and is associated with the simulated MTTR setting. The simulated write counter provides a count of the number of times an element is removed from the simulated checkpoint queue, wherein the element is removed from the simulated checkpoint queue in response to a write out of a buffer from volatile memory and storing in nonvolatile memory.

43 Claims, 5 Drawing Sheets

U.S. PATENT DOCUMENTS

| | | | | |
|---|---|---|---|---|
| 2002/0103819 A1* | 8/2002 | Duvillier et al. | | 707/206 |
| 2003/0084372 A1* | 5/2003 | Mock et al. | | 714/15 |
| 2004/0193658 A1* | 9/2004 | Kawamura et al. | | 707/202 |
| 2004/0210577 A1* | 10/2004 | Kundu et al. | | 707/8 |
| 2005/0131853 A1* | 6/2005 | Sampath et al. | | 707/1 |

OTHER PUBLICATIONS

Nicola et al., "Comparative analysis of different models of checkpointing and recovery", IEEE 1990.*

Joshi et al., "Checkpointing in Oracle", Proceedings of the 24th VLDB conference, 1998.*

Tirthankar Lahiri et al., "Fast-Start: Quick Fault Recovery in Oracle", in ACM SIGMOD Conference 2001, pp. 6.

The Entire File History of U.S. Appl. No. 10/092,047, filed Mar. 4, 2002, entitled, "Managing Checkpoint Queues In A Multiple Node".

The Entire File History of U.S. Appl. No. 09/834,342, filed Apr. 13, 2001, entitled, System and Method For Predicting Cache.

The Entire File History of U.S. Appl. No. 10/645,987, filed Aug. 22, 2003, entitled, "Reducing Disk IO By Fill-Cache Write-Merging".

* cited by examiner

MEAN TIME TO RECOVER (MTTR) ADVISORY

BACKGROUND

1. Field

The present invention relates generally to database management systems and, more particularly, to the reporting of performance effects of recovery time in database management systems.

2. Description of the Related Art

Conventional database systems, such as Oracle's relational database management system (RDBMS), permit an administrator to specify a recovery time within which the system is to recover from a system crash. In general, there is a tradeoff between the recovery time and the run-time operational performance of the database system. Typically, the smaller the recovery time, the more total physical writes (I/Os) the database system needs to perform. The database system needs to perform more physical I/Os to reduce the amount of data it needs to recover after a system crash.

For example, Oracle's RDBMS will dynamically adjust the physical I/O pace to meet the specified recovery time. Typically, a short recovery time comes at the expense of an increased number of runtime physical I/Os, which in turn reduces the system's throughput or performance.

One drawback to determining an acceptable tradeoff between recovery time and system performance is that a system administrator has to use conventional trial-and-error approaches to determine an appropriate recovery time setting. The administrator has to specify a recovery time, execute the database system for a typical workload, and document the effect of the recovery time on the system's performance. The administrator goes through several iterations of this process using different recovery times in order to determine a recovery time that satisfies both the recovery time requirement and the system performance.

What is desired is a system and method that documents the effects of multiple recovery times on system performance without requiring multiple iterations of the iterative trial-and-error process of specifying a recovery time and measuring its affect on system performance.

SUMMARY

The present invention provides a system and method that simulate the effects of one or more mean time to recover (MTTR) values on the runtime performance of a system, such as, by way of example, a database system. An MTTR value specifies an allowable recovery time within which the system is to recover should a system failure or crash occur.

In one embodiment, the effect of one or more MTTR values is simulated under normal operating conditions using actual runtime data. The MTTR values used in simulation (also called simulated MTTR values) are centered around a current MTTR target. The effects of the simulated MTTR values on system performance is measured during the simulation in terms of the number of runtime physical inputs and outputs (I/Os) to disk that would have occurred if the system was executing with the respective simulated MTTR value as the current MTTR target. Thus, after the simulation (e.g., a run of respective workloads), a user (e.g., a system administrator) can query the system to see the number of physical I/Os that would be generated if a simulated MTTR value had been used as the current MTTR target.

DETAILED DESCRIPTION

A system and method for simulating the effects of multiple settings of mean time to recovery (MTTR) on system performance are described below. In one embodiment, a method for simulating different MTTR settings includes: providing a simulated checkpoint queue, the simulated checkpoint queue being associated with a simulated MTTR setting; the simulated checkpoint queue being an ordered list of one or more elements, each of the one or more elements representing a buffer, the ordered list having a head and a tail; providing a simulated write counter, the simulated write counter being associated with the simulated MTTR setting; the simulated write counter providing a count of the number of times an element is removed from the simulated checkpoint queue in response to a write out of a buffer from volatile memory to nonvolatile memory. In response to detecting a change to a buffer in a checkpoint queue used in normal operation, checking if the changed buffer is represented in the simulated checkpoint queue, and if the changed buffer is not represented in the simulated checkpoint queue, linking an element that represents the changed buffer to the tail of the simulated checkpoint queue.

In another embodiment, the aforementioned method further includes: determining if linking the element to the tail of the simulated checkpoint queue causes the simulated checkpoint queue to exceed a predetermined length; and in response to determining that the predetermined length is exceeded, removing an element from the head of the simulated checkpoint queue and incrementing the simulated write counter.

In still another embodiment, a computer-readable storage medium has stored thereon computer instructions that, when executed by a computer, cause the computer to perform the above-described methods.

In yet a further embodiment, the aforementioned computer-readable storage medium has further stored thereon computer instructions that, when executed by a computer, cause the computer to, in response to a write out of a buffer from volatile memory and storing in nonvolatile memory, check if the written-out buffer is represented in the simulated checkpoint queue, and if the written-out buffer is represented in the simulated checkpoint queue, remove the element representing the written-out buffer from the simulated checkpoint queue and increment the simulated write counter.

In one embodiment, an MTTR advisory system includes a memory, one or more processors coupled to the memory, a simulated MTTR setting, a simulated checkpoint queue, and a simulated write counter. The simulated MTTR setting is maintained in the memory. The simulated checkpoint queue is maintained in the memory and associated with the simulated MTTR setting. The simulated write counter is also maintained in the memory, and is also associated with the simulated MTTR setting.

Above-described embodiments provide a system and method that simulate runtime performance effects of one or more MTTR settings on a system. The one or more MTTR settings are simulated while the system is executing with a current MTTR target. Thus, the system and method permit a user to select an MTTR target value that satisfies the user's recovery time requirement while having a minimal or acceptable impact on system performance or throughput without requiring the user to perform multiple iterations of a trial-and-error process (e.g., specifying a MTTR target and measuring its affect on system performance repeatedly). Even though the described embodiments are suitable for use in systems that perform log-based recovery (i.e., database systems, etc.) and/or systems that perform checkpointing or a variation of checkpointing to improve system recovery time (i.e., database systems, super-computing applications, etc.), for the purposes of explanation, the embodiments are further disclosed in the context of one or more processes which execute as part of a database system. Throughout the drawings, like numerals are used for like and corresponding parts of the various drawings.

The current description is presented largely in terms of processes and symbolic representations of operations performed by computers, including computer components. A computer may be any microprocessor or processor (hereinafter referred to as processor) controlled device such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium.

The computer may be a uniprocessor or multiprocessor machine. Additionally the computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic that may be used in some embodiments includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

The program logic can be maintained or stored on a computer-readable storage medium. The term "computer-readable storage medium" refers to any medium that participates in providing the symbolic representations of operations or data to a processor for execution. Such media may take many forms, including, without limitation, volatile memory, nonvolatile memory, electronic transmission media, and the like. Volatile memory includes, for example, dynamic memory and cache memory normally present in computers. Nonvolatile memory includes, for example, optical or magnetic disks.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as, by way of example, read-only memory (ROM).

One embodiment is centered on buffer cache checkpoint queue simulation. A database system of this embodiment maintains a buffer cache checkpoint queue in volatile memory. The buffer cache checkpoint queue contains an ordered list of dirty buffers. A "dirty" buffer is defined as a buffer that contains data that has been modified or updated by a transaction but has not yet been saved to nonvolatile memory (i.e., the database). Because the buffer cache checkpoint queue is maintained in volatile memory, various types of failures can cause the information contained in the buffers of the buffer cache checkpoint queue to be lost.

The database system maintains a redo log file to facilitate the recovery of the data contained in the buffer cache checkpoint queue. The redo log file is maintained in non-volatile memory and is a collection of journal entries. Each journal entry contains a description of the changes to data that were made by a particular transaction. The database system can use the information contained in the journal entries to recreate the dirty buffers in the buffer cache checkpoint queue.

If a database failure occurs, the database system needs to be recovered in a reasonable amount of time. As part of the recovery, the buffer cache checkpoint queue needs to be recreated to the state it was in just prior to the failure. An MTTR target is a parameter in the database system that specifies the amount of time the recovery should be performed in should a system failure occur.

One factor that affects recovery time is the recreation of the dirty buffers in the buffer cache checkpoint queue. To recreate the buffer cache checkpoint queue, the database system reads a journal entry from the redo log file, reads the appropriate record from the database (i.e., nonvolatile memory), links the record as a buffer into an appropriate position in the buffer cache checkpoint queue, and applies the transaction specified in the journal entry to the buffer. This process is repeated for each journal entry in the redo log file. Of the time it takes to recreate the buffer cache checkpoint queue, the vast majority of the time is devoted to reading the record from the database and reapplying the transaction specified in the journal entry to the record.

The database system uses historical performance data to appropriately allocate the portion of the MTTR target value to the various tasks performed during the recovery process. For example, the database system may determine data, such as, by way of example, the average time it takes to read one journal entry in the redo log file, the average time it takes to read one record from nonvolatile memory to volatile memory, the average time it takes to apply a transaction to the record, and the like, from prior system runtime and recovery performance. The database system may have also determined from past performance factors, such as, the average time it takes to perform system initialization. From these and other applicable factors, the database system can calculate the maximum number of dirty buffers it can recreate during the recovery process and still satisfy the recovery time as specified by the MTTR target value. The number of dirty buffers determines the maximum length of the buffer cache checkpoint queue (dirty buffer limit).

The database system utilizes incremental checkpointing to ensure that the buffer cache checkpoint queue does not exceed the calculated maximum length and also to reduce the number of journal entries that are unnecessarily read during the recovery process. The buffer cache checkpoint queue is maintained as an ordered list of buffers and has a head and a tail. The ordered list of buffers corresponds to the ordering of each buffer's associated journal entry in the redo log file. A checkpoint value contains a redo byte address that identifies the journal entry in the redo log file associated with the buffer at the head of the buffer cache checkpoint queue.

An incremental checkpoint can potentially occur each time a user updates or changes a record in the database. An update to a record can cause a new buffer to be added to the tail of the buffer cache checkpoint queue if the buffer representing the record is not already contained in the buffer cache checkpoint queue. When a new dirty buffer is added to the tail of the buffer cache checkpoint queue (thus becoming the new tail), the database system checks the length of the buffer cache checkpoint queue. If the length of the buffer cache checkpoint queue exceeds the predetermined maximum length (as calculated based on the MTTR setting), the database system incrementally checkpoints the buffer at the head of the buffer cache checkpoint queue by dequeuing the buffer and writing out the data in the buffer to the database (i.e., nonvolatile memory). The change to the record as represented in the buffer is written to the database and, thus, the buffer is no longer dirty. This creates a new head buffer in the buffer cache checkpoint queue and the database system accordingly sets the checkpoint value in the redo log file to identify the new head of the ordered list of buffers (e.g., the checkpoint value identifies the journal entry associated with the new head buffer in the buffer cache checkpoint queue).

An incremental checkpoint can also occur as a result of a change to one or more system parameters or settings. For example, an administrator may have changed the MTTR setting to a different value or changed one or more other parameters that results in a recalculation of the dirty buffer limit. If the length of the buffer cache checkpoint queue exceeds the newly calculated dirty buffer limit, the database system can then dequeue the appropriate number of buffers from the head of the buffer cache checkpoint queue and write out the respective data to the database. The database system accordingly sets the checkpoint value in the redo log file to identify the journal entry associated with the new head of the buffer cache checkpoint queue.

One or more buffers can be removed from the buffer cache checkpoint queue during database operation. The database system can store one or more records in cache memory to increase system performance. One or more of the records in the cache can become modified during database operation, thus causing the creation of one or more respective dirty buffets in the buffer cache checkpoint queue. Subsequently, the records in the cache memory, including one or more of the updated records, may be written out to the database. For example, records in cache memory can be written out to the database using a predetermined method (e.g., oldest, least use, etc.). Whenever an updated record is written out from cache to the database, its respective dirty buffer in the buffer cache checkpoint queue is no longer "dirty." Thus, the database system removes the appropriate buffer from the buffer cache checkpoint queue.

A physical write occurs every time a record or buffer is written out from volatile memory to the database (nonvolatile memory). Thus, removing a dirty buffer from the buffer cache checkpoint queue causes an occurrence of a physical write. Performing a physical write consumes system resources (e.g., processing capacity, etc.) and thus, impacts system performance.

In one embodiment, the database system provides a count of physical writes that would have occurred had the database system being executing under each of multiple MTTR values. The database system maintains a count of physical writes under a current MTTR setting and two simulated MTTR settings. The first simulated MTTR setting is at one-half (0.5) the current MTTR setting and the second simulated MTTR setting is at one and one-half (1.5) the current MTTR setting. The database system creates and maintains a simulated checkpoint queue for each simulated MTTR setting. The database system calculates the dirty buffer limit of each simulated checkpoint queue in the same manner as the dirty buffer limit of the buffer cache checkpoint queue.

Each of the simulated checkpoint queues contain elements that represent dirty buffers had the database system been executing using its respective simulated MTTR setting as the current MTTR setting. The database system can use the simulated checkpoint queue to maintain and identify the dirty buffers in the system at a particular point in time for its respective simulated MTTR setting. Thus, using the simulated checkpoint queues, the database system can simulate the number of physical writes that would have occurred for each simulated MTTR setting.

For example, a system administrator or other user can provide a current MTTR setting and activate simulation. The database system performs the simulation under normal executing conditions. Subsequently, for example, after a sufficient amount of transactions or time passes, the administrator can deactivate the simulation and request the results of the simulation. The database system reports the number of physical writes that actually occurred during the simulation period (the number of physical writes that occurred as a result of the current MTTR setting) and the number of physical writes that would have occurred under each of the simulated MTTR settings. Using this data, the administrator can decide an MTTR setting that best fits the run-time performance and recovery time concerns in the future.

In another embodiment, the database system maintains a count of other performance data, such as, by way of example, the number of time a record is read into memory, the number of time a journal entry is read, and the like, for the one or more MTTR settings. Those of skill in the art will realize that the database system can simulate a different number of MTTR settings or use different factors to derive the simulated MTTR settings without detracting from the essence of the invention.

Figure 1:
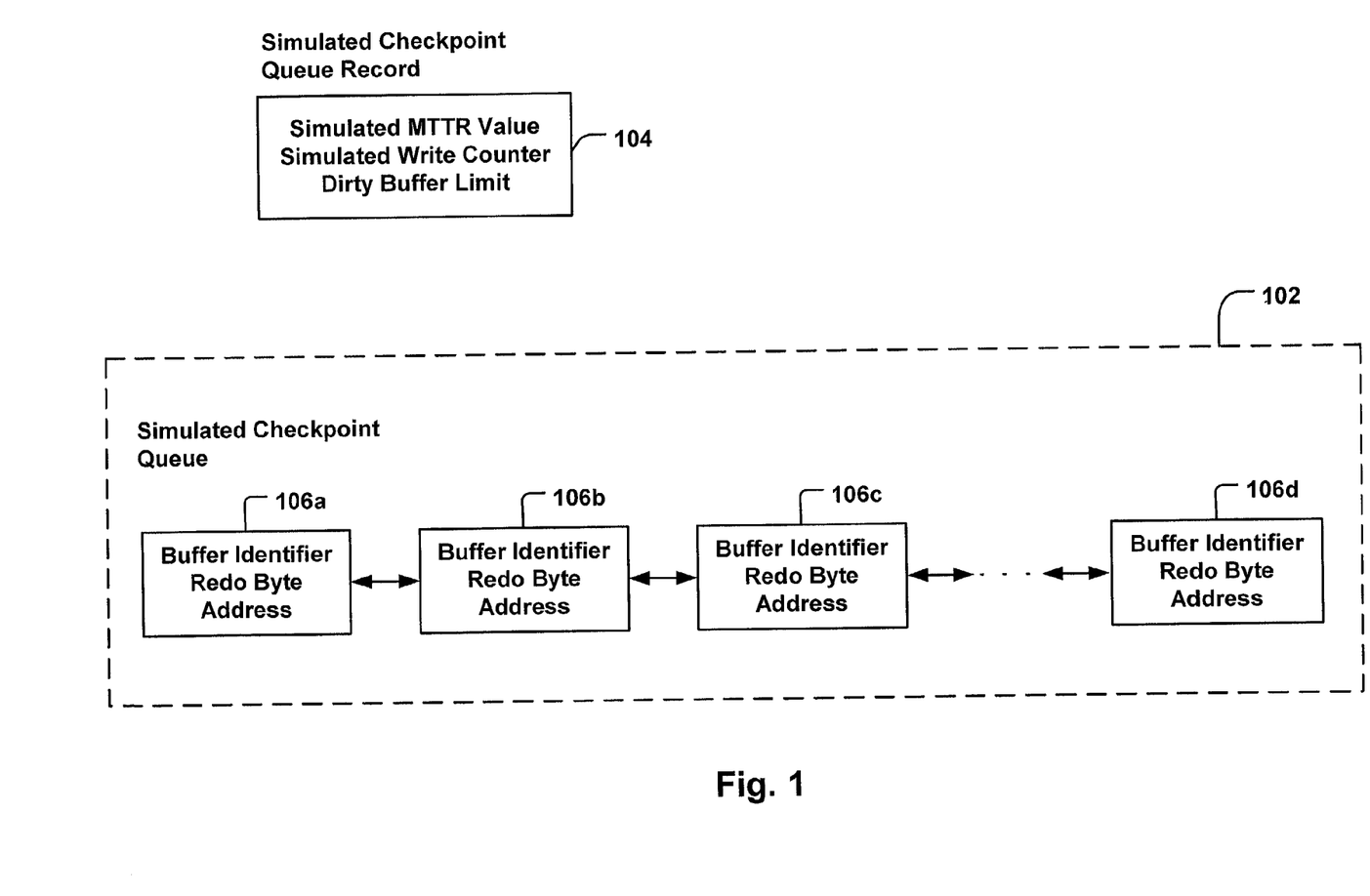
FIG. 1 illustrates an exemplary simulated checkpoint queue and associated simulated checkpoint queue record, according to one embodiment.

FIG. 1 illustrates a simulated checkpoint queue 102 and an associated simulated checkpoint queue record 104, according to one embodiment. The database system utilizes simulated checkpoint queue 102 and its respective simulated checkpoint queue record 104 in facilitating MTTR and buffer cache checkpoint queue simulation. The database system creates and maintains a simulated checkpoint queue 102 and corresponding simulated checkpoint queue record 104 for each simulated MTTR setting. To perform simulation, the database system maintains each simulated checkpoint queue 102 in the same manner the system maintains the buffer cache checkpoint queue.

Simulated checkpoint queue 102 can be implemented as a linked list. As depicted, simulated checkpoint queue 102 includes elements 106a–d. Element 106a is linked to element 106b, element 106b is linked to element 106c, element 106c is linked to a subsequent element (not depicted), with element 106d being the final element in simulated checkpoint queue 102.

Each element 106 in simulated checkpoint queue 102 represents a dirty buffer, and as depicted, includes a buffer identifier field and a redo byte address field. The buffer identifier field records an identifier that identifies its corresponding buffer. The redo byte address field records an identifier that identifies the earliest redo byte address of the journal entry that describes changes to the identified buffer in the redo log file. Thus, simulated checkpoint queue 102 identifies the buffers that would be dirty had the respective simulated MTTR setting been the current MTTR setting in the database system.

In another embodiment, database system utilizes a hash table to identify the buffers in each simulated checkpoint queue 102. In this embodiment, the buffer identifier records a pointer that points back to its corresponding hash table entry. The hash entry indicates if a particular buffer is represented in simulated checkpoint queue 102 for the MTTR settings being simulated.

In one embodiment, simulated checkpoint queue 102 maintains an ordered list of elements. Simulated checkpoint queue 102 maintains its elements 106 in order from oldest to newest (e.g., according to each element's first or earliest corresponding journal entry in the redo log file). In this embodiment, element 106a is older than element 106b, element 106b is older than element 106c, and element 106c is older than element 106d. Moreover, element 106a has a corresponding journal entry that is positioned in the redo log file before the earliest journal entry associated with element 106b, and so on. Furthermore, element 106a is the head of the linked list and element 106d is the tail of the linked list. The redo byte address value associated with each element 106 is used to sort a new element 106 into the tail of simulated checkpoint queue 102.

As depicted, simulated checkpoint queue record 104 includes a simulated MTTR value field, a simulated write counter field, and a dirty buffer limit field. The simulated MTTR value field records the simulated MTTR setting for the particular simulated checkpoint queue record 104 and its associated simulated checkpoint queue 102. The simulated write counter field records a count of the simulated number physical writes had the database system been operating with the simulated MTTR setting as the current MTTR setting. The dirty buffer limit field records the calculated dirty buffer limit for the simulated MTTR setting. The dirty buffer limit is the maximum length of simulated checkpoint queue 102 associated with the simulated MTTR setting and determines or limits the maximum number of elements 106 in simulated checkpoint queue 102. The database system determines the dirty buffer limit for each simulated checkpoint queue 102 in the same manner and method as it determines the dirty buffer limit for the buffer cache checkpoint queue. The dirty buffer limit for the simulated MTTR setting specifies the maximum number of dirty buffers the database system can recreate during recovery after a system failure and still recover within the time specified by the simulated MTTR setting.

Figure 2:
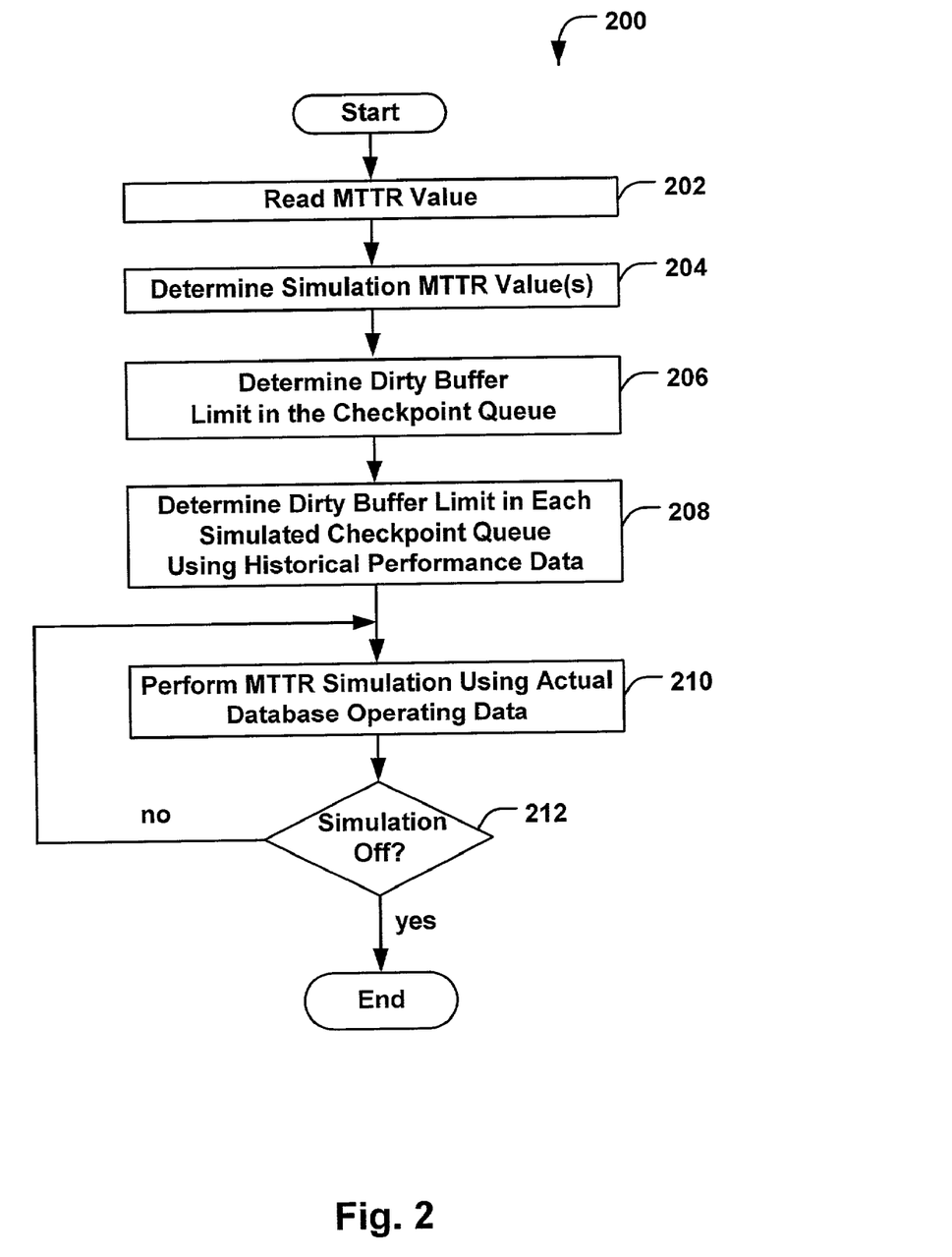
FIG. 2 is a flow chart of an overall method for performing MTTR simulation, according to one embodiment.

FIG. 2 is a flow chart of an exemplary method 200 for performing MTTR simulation, according to one embodiment. Method 200 can be performed by one or more modules or components of a database system. Beginning a start step, a database system administrator may have activated a simulation option provided on the database system. At step 202, the database system reads the current MTTR setting. At step 204, the database system determines one or more MTTR settings to be simulated.

For example, the database system may simulate two MTTR settings that are based on the current MTTR setting. The first simulated MTTR setting may be at one one-half (0.5) of the current MTTR setting, and the second simulated MTTR setting may be at one and one-half (1.5) of the current MTTR setting. The database system can maintain the data associated with each simulated MTTR setting in a respective simulated checkpoint queue record 104.

At step 206, the database system determines a dirty buffer limit for the buffer cache checkpoint queue. The database system calculates or determines the dirty buffer limit from the current MTTR setting and past operating and performance data. At step 208, the database system determines a dirty buffer limit for each of the simulated checkpoint queues. Each simulated MTTR setting has an associated simulated checkpoint queue, and the database system calculates or determines the dirty buffer limit for each simulated checkpoint queue from the respective simulated MTTR setting and past operating and performance data. The past operating and performance data is substantially the same past data used in calculating the dirty buffer limit for the buffer cache checkpoint queue.

Continuing the above example, the database system maintains a first simulated checkpoint queue for the first simulated MTTR setting and a second simulated checkpoint queue for the second simulated MTTR setting in performing the simulation. The database system also calculates a first dirty buffer limit for the first simulated checkpoint queue using, for example, the first simulated MTTR setting and past performance data. The database system also calculates a second dirty buffer limit for the second simulated checkpoint queue in a similar manner.

At step 210, the database system performs MTTR simulation using actual database transactions that are requested and which occur within the database system under normal operating conditions. The database system performs the simulation by monitoring the necessary transactions and maintaining the simulated checkpoint queues based on the monitored transactions.

In one embodiment, the database system traces three types of operations that occur in the system to perform MTTR simulation. The three types of operations are buffer change (e.g., a buffer currently in cache memory is changed), buffer replacement (e.g., a buffer in cache memory is written out to nonvolatile memory), and incremental checkpoint. In other embodiments, one or more of the aforementioned operation types can be omitted or one or more other types of operations involving the storing of data from volatile memory to nonvolatile memory can also be traced to perform MTTR simulation.

In order to amortize the simulation cost (the impact on system performance to perform the simulation), the three types of operations are logged as entries in an MTTR simulation trace buffer (trace buffer). Each type of operation has its own entry operation code (opcode). In one embodiment, the database system periodically processes all the entries in the trace buffer, for example, when the number of entries reaches one-half the trace buffer size. Thus, simulation is performed as a "batch" process. In other embodiments, database system can use other factors (e.g., processor or system utilization, timer, etc.) to determine the periodic frequency with which it processes the entries in the trace buffer.

For example, each time a buffer in cache memory is changed (i.e., dirtied), the database system logs the identifier of the buffer and the redo byte address that identifies the journal entry associated with the change in the trace buffer as a buffer change entry. Each time a dirty buffer is written out from cache to nonvolatile memory for a noncheckpointing reason, the database system logs the identifier of the buffer in the trace buffer as a buffer replacement entry. The database system also logs periodic incremental checkpoints into the trace buffer. For example, the database system logs the current incremental checkpoint value (redo byte address) in the trace buffer as an incremental checkpoint entry every three seconds.

In another embodiment, the database system can perform simulation in real-time or quasi real-time. Instead of logging events in the trace buffer and periodically processing the entries in the trace buffer, the database system can perform simulation soon after the appropriate operations occur. For example, upon detecting one of the aforementioned traced operations, the database system can process the effects of the detected operation on the simulated checkpoint queue as soon as practically possible. Those of skill in the art will realize that real-time and quasi real-time are terms of art and as used herein, is intended to cover processing that occurs concurrently as well as processing that occurs within a short amount of time. The amount of time is determined by factors such as processing speed, processing capability, processor bandwidth, etc.

At step 212, the database system checks to determine if simulation is deactivated. If the simulation is not deactivated, the database system continues simulation (step 210). Otherwise, if simulation is deactivated, the database system ends simulation.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps depending on the embodiment.

Figure 3:
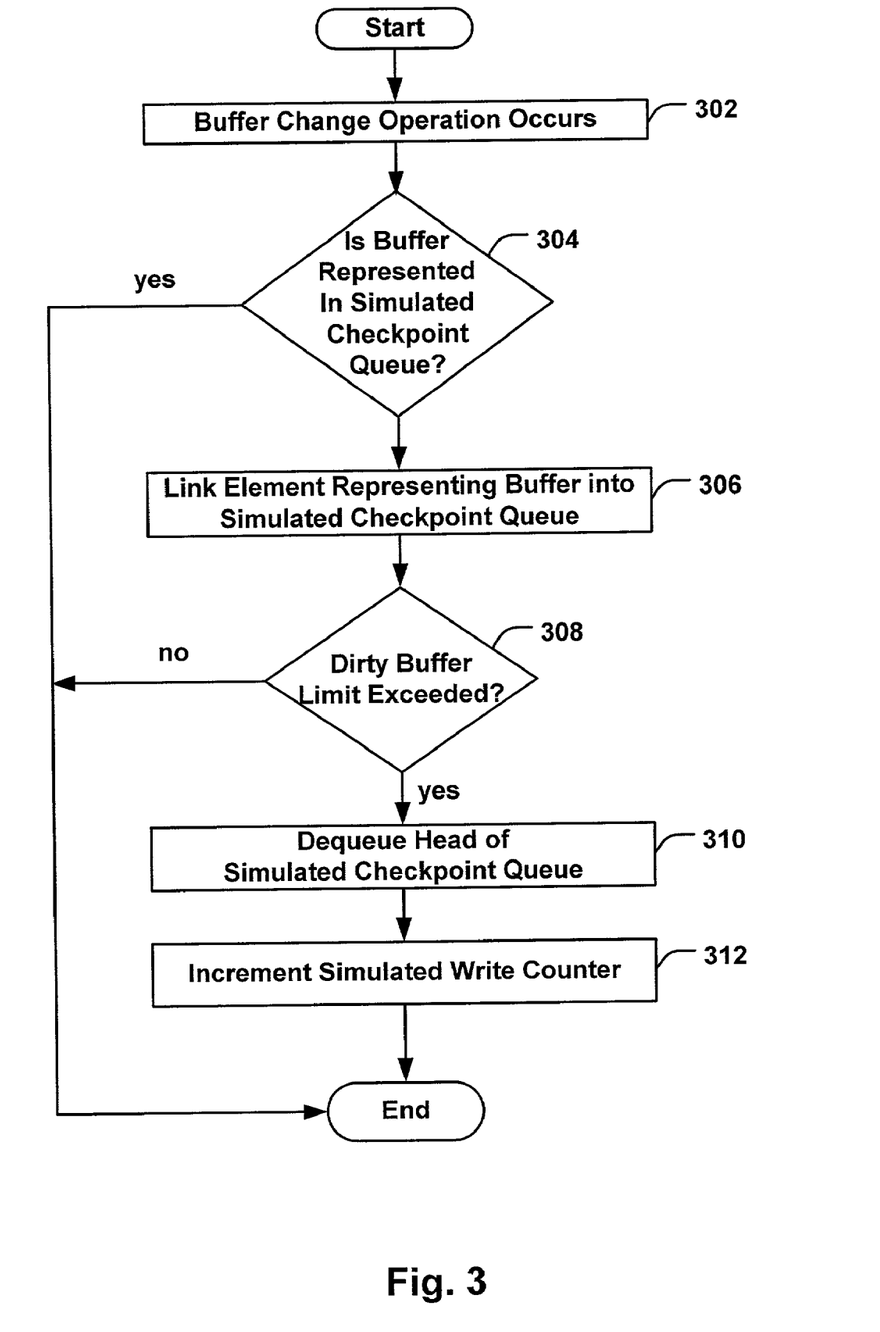
FIG. 3 is a flow chart of an exemplary method for processing a buffer change operation on a simulated checkpoint queue, according to one embodiment.

FIG. 3 is a flow chart of an exemplary method 300 for processing a buffer change operation on a simulated checkpoint queue, according to one embodiment. The database system performs method 300 for each simulated MTTR setting and its associated simulated checkpoint queue. Beginning at a start step, the database system determines a need to process a buffer change operation at step 302. The database system identifies the buffer that is involved in the buffer change operation.

At step 304, the database system determines if the identified buffer is represented by an element in the simulated checkpoint queues. For example, the database system checks each simulated checkpoint queue to see if it contains an element that represents the identified buffer. If the identified buffer is represented in the simulated checkpoint queue, the buffer is already represented as a dirty buffer, thus, there is no need to create a new element in the simulated checkpoint queue. Upon checking the simulated checkpoint queues, the database system ends processing the buffer change operation.

If, at step 304, the database system determines that the identified buffer is not represented by an element in the simulated checkpoint queue, the database system links an element representing the buffer to the end or tail of the simulated checkpoint queue at step 306. At step 308, the database system checks the simulated checkpoint queue size to determine if it has exceeded its predetermined dirty buffer limit. For example, the database system counts the number of elements or dirty buffers in the simulated checkpoint queue to see if it exceeds the dirty buffer limit. If the simulated checkpoint queue size does not exceed the dirty buffer limit, there is no need to write out a dirty buffer. Upon checking the simulated checkpoint queues, the database system ends processing the buffer change operation.

If, at step 308, the simulated checkpoint queue size exceeds the dirty buffer limit, the database system dequeues the head element in the simulated checkpoint queue at step 310. The element that previously followed the dequeued element becomes the new head of the linked list in the simulated checkpoint queue and the simulated checkpoint queue size no longer exceeds the dirty buffer limit. At step 312, the database system increments the simulated write counter associated with the simulated MTTR setting and the simulated checkpoint queue. Upon checking the simulated checkpoint queues, the database system ends processing the buffer change operation.

For example, the database system, had it been operating with the particular MTTR setting as the current MTTR setting, would have removed a dirty buffer as a result of exceeding the limit on the number of allowable dirty buffers in the simulated checkpoint queue (e.g., had the simulated checkpoint queue been the buffer cache checkpoint queue). As a result, the database system would have written out a dirty buffer from the head of the queue to the database or other nonvolatile memory. This would have created at a minimum an instance of a physical write. The physical write that would have occurred had the simulated MTTR setting been the current MTTR setting is represented by an increase in the count of simulated writes maintained in the simulated write counter associated with the simulated MTTR setting.

Figure 4:
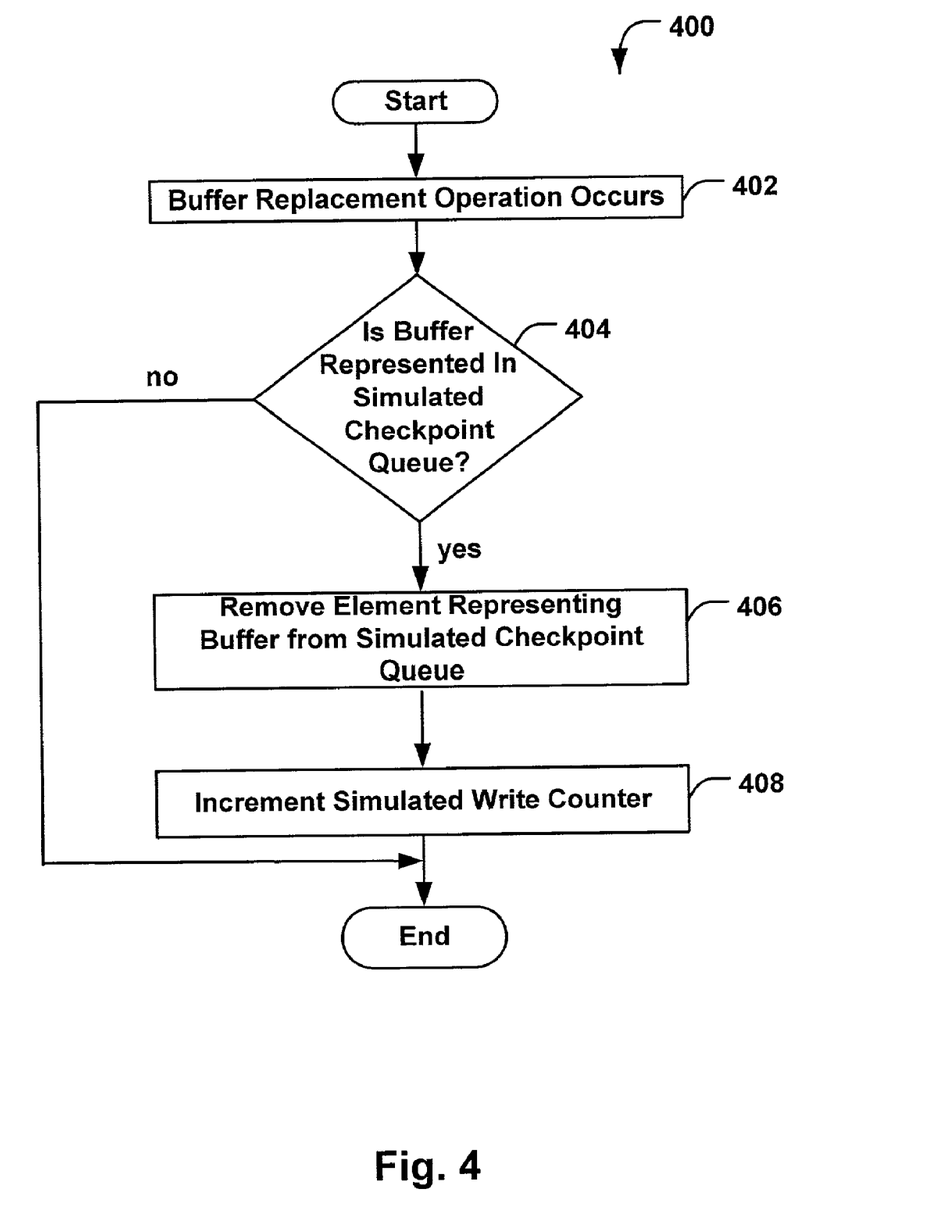
FIG. 4 is a flow chart of an exemplary method for processing a buffer replacement operation on a simulated checkpoint queue, according to one embodiment.

FIG. 4 is a flow chart of an exemplary method 400 for processing a buffer replacement operation on a simulated checkpoint queue, according to one embodiment. The database system performs method 400 for each simulated MTTR setting and its associated simulated checkpoint queue. Beginning at a start step, the database system determines a need to process a buffer replacement operation at step 402. The database system identifies the buffer that is involved in the buffer change operation.

At step 404, the database system determines if the identified buffer is represented by an element in the simulated checkpoint queue. For example, the database system checks each simulated checkpoint queue to see if it contains an element that represents the identified buffer. If the identified buffer is not represented in the simulated checkpoint queue, the buffer was not a dirty buffer in the database system. For example, had the simulated MTTR setting been the current MTTR setting, the buffer involved in the buffer replacement operation would not have been a dirty buffer and a physical write would not have occurred. Upon checking the simulated checkpoint queues, the database system ends processing the buffer replacement operation.

If, at step 404, the database system determines that the identified buffer is represented in the simulated checkpoint queue, the database system removes the element representing the identified buffer from the simulated checkpoint queue at step 406. At step 408, the database system increments the simulated write counter associated with the simulated MTTR setting and the simulated checkpoint queue. Upon checking the simulated checkpoint queues, the database system ends processing the buffer replacement operation. Thus, the database system simulates the event that the dirty buffer is written out to the database or other nonvolatile memory. For example, had the simulated MTTR setting been the current MTTR setting, the buffer would have been a dirty buffer and would have been written out to the database as a result of the buffer replacement operation, thus, causing an instance of a physical write.

Figure 5:
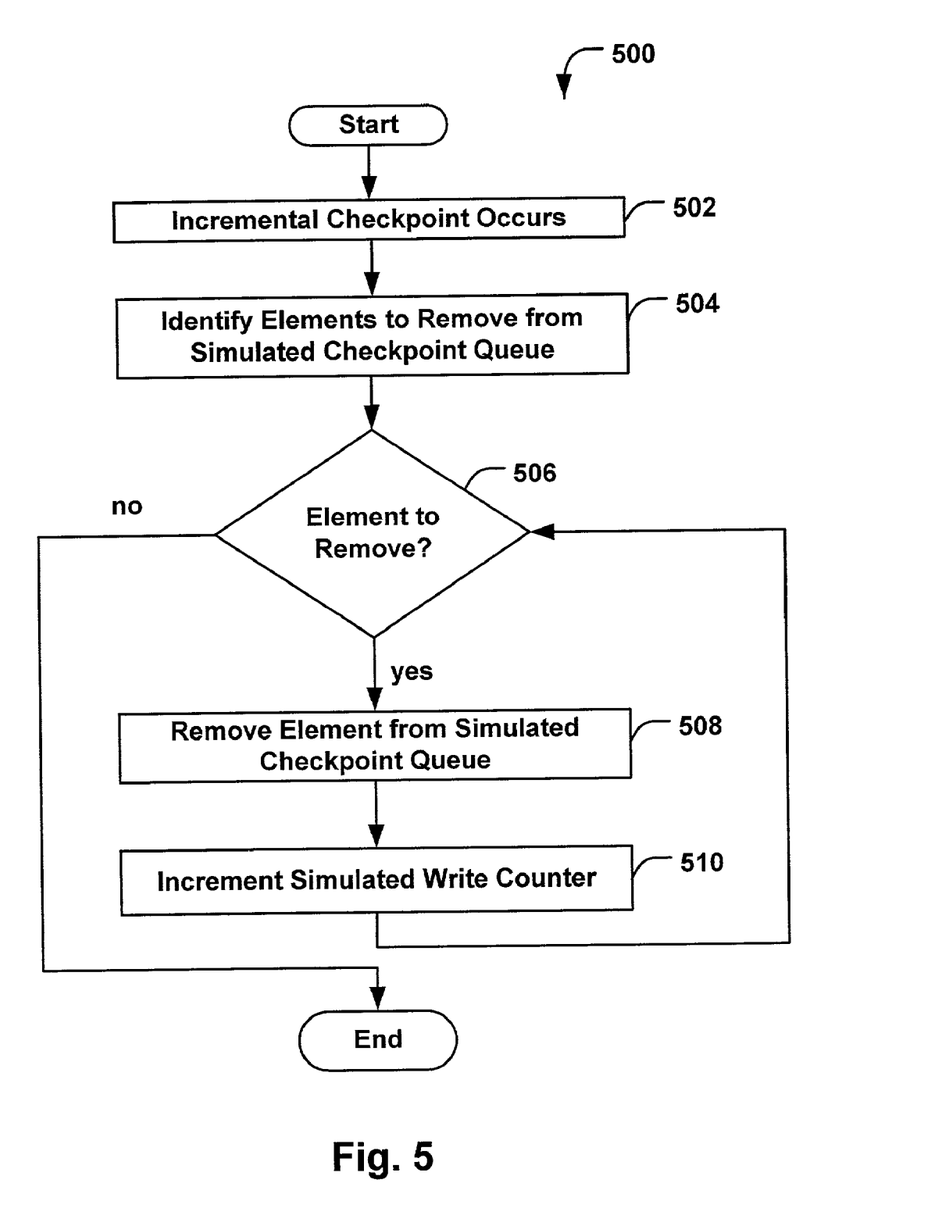
FIG. 5 is a flow chart of an exemplary method for processing an incremental checkpoint operation on a simulated checkpoint queue, according to one embodiment.

FIG. 5 is a flow chart of an exemplary method 500 for processing an incremental checkpoint operation on a simulated checkpoint queue, according to one embodiment. The database system performs method 500 for each simulated MTTR setting and its associated simulated checkpoint queue. Beginning at a start step, the database system determines a need to process an incremental checkpoint operation at step 502. The database system identifies the buffers that were involved in the incremental checkpoint operation. From the identified buffers, the database system determines the elements it needs to remove from each of the simulated checkpoint queues at step 504. The identified elements identify and represent the identified buffers involved in the simulated checkpoint operation.

For example, the incremental checkpoint operation may have created a new checkpoint value in the redo log file. The newly created checkpoint value may now identify a new redo byte address (i.e., journal entry) in the redo log file. As a result of the incremental checkpoint operation, the dirty buffers in the buffer cache checkpoint queue that were associated with journal entries positioned before the new checkpoint value in the redo log file would have been written out to the database or nonvolatile memory. Thus, the elements in the simulated checkpoint queues that identify a dirty buffer that was actually written out need to be removed from the simulated checkpoint queues. Furthermore, to simulate the physical writes, the appropriate simulated write counters need to be incremented for each removed element.

At step 506, the database system determines if there are identified elements to process. If there are no more elements to process (e.g., the database system has checked each simulated checkpoint queue for all the identified elements), the database system ends processing the incremental checkpoint operation. Otherwise, the database system continues processing the identified elements, for example, one element at a time. At step 508, the database system checks each simulated checkpoint queue for an identified element. In particular, if the identified element that is being processed is found in the simulated checkpoint queue, the database system removes the element from the simulated checkpoint queue.

At step 510, the database system increments the appropriate write counter and continues processing the next identified element at step 506. Thus, the database system simulates the event that the dirty buffer is written out to the database or other nonvolatile memory as a result of the incremental checkpointing. For example, had the simulated MTTR setting been the current MTTR setting, the buffer would have been a dirty buffer and would have been written out to the database as a result of the incremental checkpoint operation, thus, causing an instance of a physical write.

This invention may be provided in other specific forms and embodiments. The embodiments described above are to be considered in all aspects as illustrative only and not restrictive in any manner. Numerous modifications and adaptations of the embodiments, examples and implementations described above are encompassed by the attached claims.

What is claimed is:

1. A computer implemented method that comprises a database system, to simulate effect of a recovery time required for the database system to recover from a database failure on runtime performance of the database system, the method comprising:

providing in the computer, in addition to a normal checkpoint queue used in the database system for normal operation, at least one simulated checkpoint queue;

wherein the normal checkpoint queue comprises a plurality of buffers;

wherein the simulated checkpoint queue is an ordered list of one or more elements, each element in the simulated checkpoint queue representing a respective buffer that is or was in the normal checkpoint queue, the ordered list having a head and a tail;

wherein the simulated checkpoint queue is associated with a setting for recovery time whose effect on runtime performance of the database system is being simulated in the computer;

in response to detecting a change to a buffer in the normal checkpoint queue due to actual database transactions occurring within the database system under normal operating conditions, checking if the buffer is represented in the simulated checkpoint queue, and if the buffer is not represented in the simulated checkpoint queue, linking an element that represents the buffer to the tail of the simulated checkpoint queue;

providing a simulated write counter, the simulated write counter being associated with the setting for recovery time;

wherein the simulated write counter provides a count of a number of times any element is removed from the simulated checkpoint queue in response to a simulated write out of the respective buffer from volatile memory to nonvolatile memory;
determining if linking the element to the simulated checkpoint queue causes the simulated checkpoint queue to exceed a predetermined length; and
in response to determining that the simulated checkpoint queue exceeds the predetermined length, removing an element from the head of the simulated checkpoint queue and incrementing the simulated write counter.

2. The method of claim 1, wherein the predetermined length is a dirty buffer limit.

3. The method of claim 1 further comprising:
writing out of the any buffer from volatile memory and storing in nonvolatile memory using an incremental checkpoint operation in the normal operation of the database;
in response to detecting a write out of any buffer by the incremental checkpoint operation, checking if that buffer is represented in the simulated checkpoint queue, and if that buffer is represented in the simulated checkpoint queue, removing the element representing that buffer from the simulated checkpoint queue and incrementing the simulated write counter.

4. The method of claim 1, wherein each element in the simulated checkpoint queue comprises:
a first identifier that identifies the respective buffer in the normal checkpoint queue; and
a second identifier that identifies a journal entry in a redo log, the journal entry corresponding to the respective buffer.

5. The method of claim 1, wherein the elements in the simulated checkpoint queue are ordered according to each element's journal entry position in a redo log in the database system.

6. The method of claim 1 further comprising determining a dirty buffer limit for the simulated checkpoint queue, the dirty buffer limit specifying the length of the simulated checkpoint queue, the dirty buffer limit being determined from the setting of the recovery time, and historical operating data.

7. A computer-readable storage medium having stored thereon computer instructions that, when executed by a computer, cause the computer to simulate effect of a recovery time required for the database system to recover from a database failure on runtime performance of the database system, the instructions comprising instructions to:
provide in the computer, in addition to a normal checkpoint queue used in the database system for normal operation, at least one simulated checkpoint queue;
wherein the normal checkpoint queue comprises a plurality of buffers;
wherein the simulated checkpoint queue is an ordered list of one or more elements, each element in the simulated checkpoint queue representing a respective buffer that is or was in the normal checkpoint queue, the ordered list having a head and a tail;
wherein the simulated checkpoint queue is associated with a setting for simulated mean time to recover (MTTR) whose effect on runtime performance of the database system is being simulated in the computer;
in response to detecting a change to a buffer in the normal checkpoint queue due to actual database transactions occurring within the database system under normal operating conditions, check if the buffer is represented in the simulated checkpoint queue, and if the buffer is not represented in the simulated checkpoint queue, link an element that represents the buffer to the tail of the simulated checkpoint queue;
provide a simulated write counter, the simulated write counter being associated with the simulated MTTR setting;
wherein the simulated write counter provides a count of a number of times any element is removed from the simulated checkpoint queue in response to a simulated write out of the respective buffer from volatile memory to nonvolatile memory;
determine if linking the element to the tail of the simulated checkpoint queue causes the simulated checkpoint queue to exceed a predetermined length; and
in response to determining that the simulated checkpoint queue exceeds the predetermined length, remove an element from the head of the simulated checkpoint queue and increment the simulated write counter.

8. The computer-readable storage medium of claim 7, wherein the predetermined length being a dirty buffer limit.

9. The computer-readable storage medium of claim 7 further storing computer instructions that, when executed by a computer, cause the computer to, write out of the any buffer from volatile memory and storing in nonvolatile memory using an incremental checkpoint operation in the normal operation of the database;
in response to detecting a write out of any buffer by the incremental checkpoint operation, check if that buffer is represented in the simulated checkpoint queue, and if that buffer is represented in the simulated checkpoint queue, remove the element representing that buffer from the simulated checkpoint queue and increment the simulated write counter.

10. The computer-readable storage medium of claim 7, wherein each element in the simulated checkpoint queue comprises:
a first identifier that identifies the respective buffer in the normal checkpoint queue; and
a second identifier that identifies a journal entry in a redo log, the journal entry corresponding to the respective buffer.

11. The computer-readable storage medium of claim 10, wherein the elements in the simulated checkpoint queue are ordered according to each element's journal entry position in the redo log.

12. The computer-readable storage medium of claim 7 further storing computer instructions that, when executed by a computer, cause the computer to determine a dirty buffer limit for the simulated checkpoint queue, the dirty buffer limit specifying the length of the simulated checkpoint queue, the dirty buffer limit being determined from the simulated MTTR setting and historical operating data.

13. The computer-readable storage medium of claim 12, wherein the historical operating data comprises an average time to read one journal entry in a redo log.

14. The computer-readable storage medium of claim 12, wherein the historical operating data comprises an average time to read one buffer from nonvolatile memory to volatile memory.

15. A system for simulating effect of a recovery time required for the database system to recover from a database failure on runtime performance of the database system comprising:
a memory for storing program instructions and data;
one or more processors coupled to the memory;
a simulated MTTR setting maintained in the memory;

a normal checkpoint queue used in the database system for normal operation, wherein the normal checkpoint queue comprises a plurality of buffers;

at least one simulated checkpoint queue;

wherein the simulated checkpoint queue is an ordered list of one or more elements, each element in the simulated checkpoint queue representing a respective buffer that is or was in the normal checkpoint queue, the ordered list having a head and a tail;

wherein the simulated checkpoint queue is associated with a setting for simulated mean time to recover (MTTR) whose effect on runtime performance of the database system is being simulated in the computer; and a simulated write counter maintained in the memory, the simulated write counter being associated with the simulated MTTR setting;

wherein the simulated write counter provides a count of the number of times an element is removed from the simulated checkpoint queue, in response to a simulated write out of a buffer from volatile memory and storing in nonvolatile memory;

wherein in response to detecting a change to a buffer in the normal checkpoint queue due to actual database transactions occurring within the database system under normal operating conditions, the instructions in memory check if the buffer is represented in the simulated checkpoint queue, and if the buffer is not represented in the simulated checkpoint queue, the instructions link an element that represents the buffer to the tail of the simulated checkpoint queue;

wherein the instructions in memory determine if linking the element to the simulated checkpoint queue causes the simulated checkpoint queue to exceed a predetermined length; and in response to determining that the simulated checkpoint queue exceeds the predetermined length, the instructions in memory remove an element from the head of the simulated checkpoint queue and increment the simulated write counter.

16. The system of claim 15, wherein instructions in memory write out of the any buffer from volatile memory and store in nonvolatile memory using an incremental checkpoint operation in the normal operation of the database;

in response to detecting a write out of any buffer by the incremental checkpoint operation, instructions in memory check if that buffer is represented in the simulated checkpoint queue, and if that buffer is represented in the simulated checkpoint queue, remove the element representing that buffer from the simulated checkpoint queue and increment the simulated write counter.

17. The system of claim 15, wherein the predetermined length being a dirty buffer limit, the dirty buffer limit being determined from the simulated MTTR setting and historical operating data.

18. The system of claim 17, wherein the historical operating data comprises an average time to read one journal entry in a redo log.

19. The system of claim 17, wherein the historical operating data comprises an average time to read one buffer from nonvolatile memory to volatile memory.

20. A computer-implemented method, to simulate effect on runtime performance of a database system, of a plurality of settings to control mean time to recover (MTTR) from a database failure, the method comprising:

using a current setting to limit MTTR of said database system for normal operation; and simulating performance of said database system for a plurality of additional settings of MTTR, using data from said normal operation.

21. The method of claim 20, wherein said data comprises actual database operating data from said database system.

22. The method of claim 20 wherein:

said simulating is performed concurrently with said performing of normal operation.

23. The method of claim 22 wherein:

results of said simulating are available in real-time.

24. The method of claim 22 wherein:

results of said simulating are available in quasi real-time.

25. The method of claim 20 wherein:

said database system comprises a buffer in cache memory; and said normal operation comprises a buffer change operation.

26. The method of claim 20 further comprising:

said database system during said normal operation, maintaining a count of physical writes from volatile memory to nonvolatile memory that actually occur;

wherein said maintaining is simulated during said simulating performance, to maintain a plurality of simulated counters of said physical writes that would have occurred for corresponding additional settings of MTTR being simulated.

27. The method of claim 20 further comprising:

said database system during said normal operation, using a normal checkpointing queue; and said simulating using a plurality of simulated checkpointing queues for corresponding additional settings of MTTR being simulated.

28. A computer-readable storage medium having stored thereon computer instructions that, when executed by a computer, cause the computer to, simulate effect on runtime performance of a database system, of a plurality of settings to control mean time to recover (MTTR) from a database failure, the computer instructions comprising instructions to:

use a current setting to limit MTTR of said database system for normal operation; and simulate performance of said database system for a plurality of additional settings of MTTR, using data from said normal operation.

29. The computer-readable storage medium of claim 28, wherein said data comprises actual database operating data from said database system.

30. The computer-readable storage medium of claim 28, wherein:

said instructions to simulate are executed concurrently with said instructions to perform normal operation.

31. The computer-readable storage medium of claim 30 wherein:

results of simulating are available in real-time.

32. The method of claim 30 wherein:

results of simulating are available in quasi real-time.

33. The computer-readable storage medium of claim 28 wherein:

said database system comprises a buffer in cache memory; and said normal operation comprises a buffer change operation.

34. The computer-readable storage medium of claim 28 further comprising instructions for:
 said database system during said normal operation, to maintain a count of physical writes from volatile memory to nonvolatile memory that actually occur;
 wherein said maintaining of the count is simulated by said instructions to simulate performance, to maintain a plurality of simulated counters of said physical writes that would have occurred for corresponding additional settings of MTTR being simulated.

35. The computer-readable storage medium of claim 28 further comprising instructions for:
 said database system during said normal operation, to use a normal checkpointing queue; and
 wherein said instructions to simulate performance comprise instructions to use a plurality of simulated checkpointing queues for corresponding additional settings of MTTR being simulated.

36. A system, to simulate effect on runtime performance of a database system, of a plurality of settings to control mean time to recover (MTTR) from a database failure, the system comprising:
 means for using a current setting to limit MTTR of said database system for normal operation; and
 means for simulating performance of said database system for a plurality of additional settings of MTTR, using data from said normal operation.

37. The system of claim 36, wherein said data comprises actual database operating data from said database system.

38. The system of claim 36 wherein:
 said means for simulating operates concurrently with said normal operation of said database system.

39. The system of claim 38 wherein:
 results of said simulating are available in real-time.

40. The method of claim 38 wherein:
 results of said simulating are available in quasi real-time.

41. The system of claim 36 wherein:
 said database system comprises a buffer in cache memory; and
 said normal operation comprises a buffer change operation.

42. The system of claim 36 further comprising:
 means for maintaining a count of physical writes from volatile memory to nonvolatile memory that actually occur during said normal operation;
 wherein said maintaining of the count is simulated in said means for simulating performance, to maintain a plurality of simulated counters of said physical writes that would have occurred for corresponding additional settings of MTTR being simulated.

43. The system of claim 36 further comprising:
 means for using a normal checkpointing queue during said normal operation;
 wherein said means for simulating performance comprises means for using a plurality of simulated checkpointing queues for corresponding additional settings of MTTR being simulated.

\* \* \* \* \*